United States Patent Office 2,790,800
Patented Apr. 30, 1957

2,790,800
ORGANIC MERCURY COMPOUNDS

Lincoln H. Werner, Summit, N. J., and Caesar R. Scholz, Binningen (Baselland), Switzerland, assignors to Ciba Pharmaceutical Products, Inc., Summit, N. J., a corporation of New Jersey No Drawing. Application December 15, 1953,
Serial No. 398,412

6 Claims. (Cl. 260—242)

This invention relates to organic mercury compounds.

It is a primary object of this invention to provide a new type of organic mercury compounds corresponding to the structure

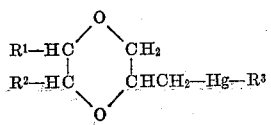

wherein $R^1$ is a member selected from the group consisting of hydrogen, —(CHOH)$_n$CH$_2$OH and —CHOHCHO, $R^2$ is a member selected from the group consisting of —(CHOH)$_n$CH$_2$OH and —CHO, $R^3$ is a member selected from the group consisting of theophylline and polyhydroxyalkylmercaptan radicals and mercapto radicals derived from aliphatic mercapto carboxylic acids, the $R^3$ radical being attached to the mercury atom through the sulfur atom thereof and $n$ is a number of 0 to 4.

The thus described compounds of this invention are produced conveniently by mercurating the monoallyl ether of a polyol compound and reacting the resulting mercurated product with theophylline or a suitable mercapto compound.

The mercuration reaction is carried out with the aid of a mercuric salt such as mercuric acetate, mercuric benzoate, or mercuric tartrate in a suitable solvent, mercuric nitrate or mercuric chloride in a suitable solvent with occasional additions of alkali to maintain a slight turbidity caused by precipitation of mercuric oxide; or with the aid of mercuric oxide in a suitable solvent containing one equivalent of an acid such as acetic, benzoic, tartaric, citric and the like. The mercurated reaction product is recovered from the reaction mixture by precipitation or by evaporating the solution to dryness, or by drying from the frozen state.

Suitable polyol compounds from which the allyl ethers are derived are selected, for example, from carbohydrates, more particularly the aldoses, ketoses, the alcohols formed by reduction of the carbonyl group present in aldoses and ketoses, and derivatives of such wherein the hydroxyl groups are protected by ester, acetal, or ketal groups and the like. Examples of suitable allyl-polyol ethers are allyl ethers derived from glycerol, glucose, xylitol, mannitol, sorbitol and the like or ester, acetal, or ketal derivatives of such wherein a free hydroxyl is present on the carbon atom adjacent to the carbon atom bearing the ether linkage such as, for example, the 3-allyl ether of 1,2;5,6-diisopropylidene mannitol and the like.

Examples of suitable solvents in which to carry out the mercuration step are dioxane, ethylene glycol dimethyl ether, acetone, aqueous mixtures with such compounds, water and the like. In general, the solvent chosen will be one in which the allyl-polyol ether is soluble.

Suitable mercapto acids are those containing a sulfhydryl radical such as thioglycollic acid, cysteine and the like. Suitable mercapto polyol compounds are, for example, thioglycerol, thioxylitol, thiosorbitol, thiomannitol and the like.

The reaction between the mercurated allyl-polyol ether and theophylline or mercapto compound is carried out in water, methanol, ethanol or in a dilute aqueous solution of methanol, acetone or the like. The resulting reaction product is then precipitated from the solution by adding further quantities of water soluble solvents such as acetone, methanol, ethanol, dioxane and the like. Any excess mercaptan remains in the supernatant liquors. The precipitated product is separated, washed and dried, whereupon it is obtained as a highly water soluble powder.

Alternatively, the mercurated allyl derivative and the theophylline or mercapto compound are mixed in stoichiometric amounts in water, and the resultant solution is frozen and dried from the frozen state to yield a product which is stable and readily soluble upon mere addition of water.

The products of the invention do not exhibit a melting point or decomposition point. However, the nature of the reaction is such that, by using pure final intermediates (especially the mercurated intermediate) and employing a slight excess of thio derivative, theophylline, etc. so that no free mercury remains, products which are eminently satisfactory for medicinal use are obtained.

The products of the present invention have utility as diuretics.

In the following examples the invention is illustrated in greater detail which is presented by way of illustration and not of limitation. In the examples, parts by weight bear the same relation to parts by volume as do grams to milliliters. Temperatures are expressed in degrees centigrade.

Example 1

6.6 parts by weight of 1-allyl-glycerol are dissolved in 10 parts by volume of water, and a solution of 16.0 parts by weight of mercuric acetate in 30 parts by volume of water is added. The reaction mixture is allowed to stand overnight, a sample tested for free mercury ion by making alkaline and, in the absence of excess of free mercury ion, the reaction mixture evaporated to dryness. The product is dissolved in anhydrous ethanol, the solution filtered and evaporated to dryness. 6-acetoxymercurimethyl-2-p-dioxane methanol is thus obtained as colorless highly viscous oil corresponding to the formula

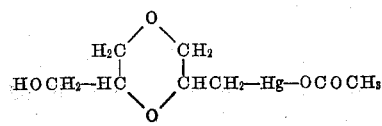

8.18 parts by weight of 6-acetoxymercurimethyl-2-dioxane methanol are dissolved in 20 parts by volume of acetone to which an equimolecular amount of thiosorbitol dissolved in 10 parts by volume of methanol is added. The product, 1-S-[6-(hydroxymethyl)-2-p-dioxanylmethylmercuri]-1-thiosorbitol, precipitates. It is washed with acetone and dried in vacuo, and is thus obtained as a hygroscopic amorphous solid which is highly soluble in water. It corresponds to the formula

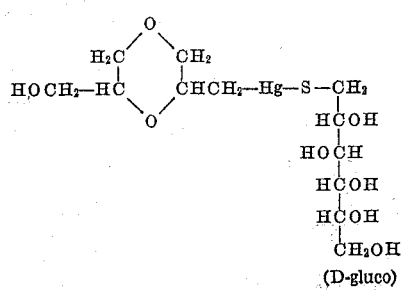

(D-gluco)

Example 2

20 parts by weight of 1,2;4,5-diisopropylidene xylitol are dissolved in 20 parts by volume of water and 85 parts by volume of acetone. The resultant solution is made alkaline with 32 parts by weight of sodium hydroxide in 32 parts by volume of water, and to the thus obtained solution are added 16.6 parts by weight of allyl bromide dissolved in 25 parts by volume of acetone. The allyl bromide solution is added dropwise with stirring over a period of three hours at 75°. The acetone is then removed by distillation, the residue diluted with 200 parts by volume of water, and the aqueous solution neutralized partially with 16.2 parts by volume of concentrated sulfuric acid in 50 parts by volume of water. The resulting solution is extracted four times with ether, each time with 100 parts by volume, and the combined extracts dried over anhydrous potassium carbonate and then evaporated to dryness. The residue is distilled under reduced pressure, boiling at 94–96° at 0.05 mm. pressure.

7.1 parts by weight of the thus obtained 3-allyl-diisopropylidenexylitol are dissolved in 50 parts by volume of water containing 1.5 parts by volume of concentrated sulfuric acid, and the solution refluxed for three hours. The solution is then cooled, neutralized with 20 parts by weight of barium carbonate, the barium salts removed by filtration, the filtrate extracted with ether to remove impurities and then evaporated to dryness. 3-allyl xylitol is thus obtained as a syrup which does not crystallize.

4.3 parts by weight of syrupy 3-allyl xylitol are dissolved in 5 parts by volume of water, and a solution of 7.2 parts by weight of mercuric acetate in 25 parts by volume of water is added. The last portions of the mercuric acetate solution are added cautiously, with testing for free mercuric ion after each addition. The addition is stopped short of excess of free mercury ion. The reaction mixture is allowed to stand for 36 hours, filtered and evaporated to dryness. The product, 1-[5-(acetoxymercurimethyl) - 3 - (hydroxymethyl)-2-p-dioxanyl]-1,2-ethanediol is obtained as a syrup corresponding to the formula

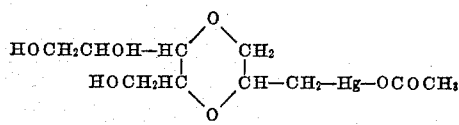

4.69 parts by weight of 1-[5-(acetoxymercurimethyl)-3-(hydroxymethyl)-2-p-dixanyl]-1,2-ethanediol are dissolved in 10 parts by volume of methanol to which an equimolecular amount of 1-thiosorbitol, dissolved in 5 parts by volume of methanol, is added. A precipitate forms. 5 parts by volume of acetone are added to complete the precipitation. The residue is washed with dry acetone, and dried under reduced pressure to an amorphous hygroscopic solid, 1-S-[5-(1,2-dihydroxyethyl)-6-(hydroxymethyl) - 2-p-dioxanylmethylmercuri]-1-thiosorbitol, which corresponds to the formula

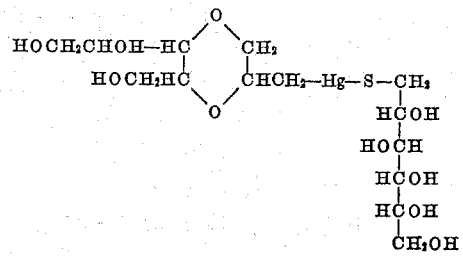

Example 3

4.45 parts by weight of 3-allyl mannitol are dissolved in 10 parts by volume of water. 6.35 parts by weight of mercuric acetate are dissolved in 20 parts by volume of water to which 2 drops of acetic acid are added, and the resulting solution is allowed to stand at room temperature (20–40°) for 16 hours. The reaction mixture is evaporated to dryness and the product is obtained as a syrup which is dried under reduced pressure.

5.0 parts by weight of the syrup and 2.25 parts by weight of 1-thiosorbitol are dissolved in 10 parts by volume of water. The product is precipitated by adding 100 parts of volume of acetone. The supernatant liquor is decanted, and the residue washed repeatedly with fresh acetone and dried under reduced pressure. The reaction product is predominantly 1 - S - [5,6-bis-(1,2-dihydroxyethyl)-2-p-dioxanylmethylmercuri]-1-thiosorbitol corresponding to the formula

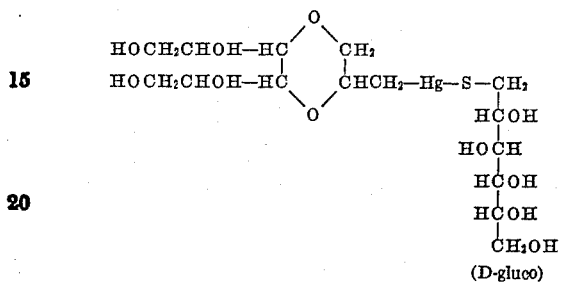

(D-gluco)

together with a minor proportion of the other isomer, 1-S-[6-(hydroxymethyl)-5-(1,2,3-trihydroxypropyl)-2-p-dioxanylmethyl-mercuri]-1-thiosorbitol corresponding to the formula

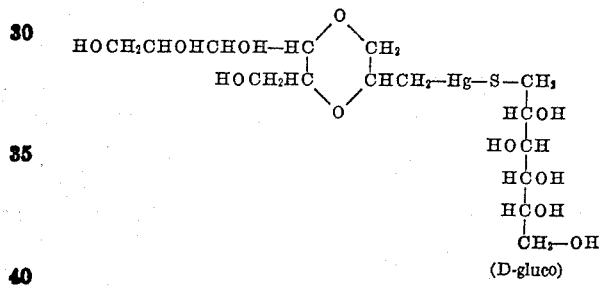

(D-gluco)

Example 4

22.6 parts by weight of diisopropylidene glucose are dissolved in 20 parts by volume of water and 85 parts by volume of acetone. A solution of 32 parts by weight of sodium hydroxide and 32 parts by volume of water is added, followed by 15.1 parts by weight of allyl bromide in 20 parts by volume of acetone, the addition of the allyl bromide solution being extended over a period of three hours and at 75° while stirring. The acetone is then removed by distillation, the residue diluted with 250 parts by volume of water, and the aqueous solution neutralized partially with 16.2 parts by volume of concentrated sulfuric acid in 50 parts by volume of water. The resulting solution is extracted four times with ether, each time with 100 parts by volume. The combined extracts are dried over anhydrous potassium carbonate and evaporated to dryness to give a syrupy residue of 3-allyl-1,2:5,6-diisopropylidene glucose.

26.18 parts by weight of 3-allyl-1,2:5,6-diisopropylidene glucose are refluxed for four hours with 100 parts by volume of water containing 4 parts by volume of concentrated sulfuric acid. The solution is then cooled, neutralized with 40 parts by weight of barium carbonate, the barium salts removed by filtration, the filtrate extracted with ether to remove impurities and then evaporated to dryness. The residue is dissolved in alcohol and the alcohol solution evaporated to dryness. On addition of ethyl acetate the residue crystallizes and is recrystallized from ethanol to yield 3-allyl glucose: melting point 133–136°.

3.6 parts by weight of 3-allyl glucose are dissolved in 6 parts by volume of water, and a solution of 5.2 parts by weight of mercuric acetate in 15 parts by volume of water added. After standing overnight, the solution is evaporated to dryness and the residue dried in vacuo to an amorphous hygroscopic solid.

5 parts by weight of the amorphous hygroscopic solid are dissolved in 10 parts by volume of water, and a 5–10% molar excess of 1-thiosorbitol added. The resulting solution gives a faint positive test for free sulfhydryl radicals when tested with sodium prusside. The solution is concentrated under reduced pressure and the syrupy product obtained as a residue is triturated with acetone and dried under reduced pressure. The exact structure of the product is unknown but it is believed to be cyclic in nature, the dioxane ring involving either positions 2 and 3 or positions 3 and 4 of the glucose chain. The corresponding formulae may be written as

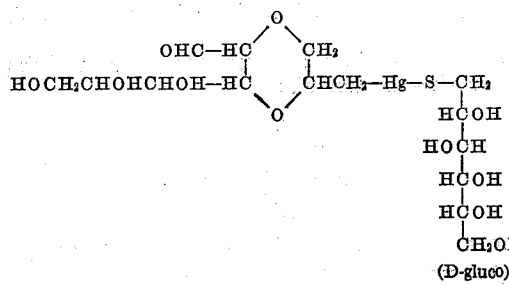
(D-gluco)

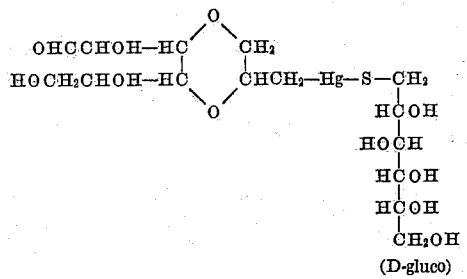
(D-gluco)

but it is to be understood that glucose may be represented by pyranose and furanose formulae.

Example 5

9.4 parts by weight of 6-allyl sorbitol are dissolved in 10 parts by volume of water, and a solution of 13.45 parts by weight of mercuric acetate in 40 parts by volume of water added. After standing overnight, the solution is filtered, evaporated to dryness and the product, 1-(6-acetoxymercurimethyl-2-p-dioxanyl)-1,2,3,4-butanetetrol, thus obtained as a syrupy residue, is dried under reduced pressure.

3.35 parts by weight of the above product are dissolved in 6 parts by volume of methanol and an equivalent amount of 1-thiosorbitol, dissolved in 5 parts by volume of methanol added. A precipitate forms. 5 parts by volume of acetone are added to complete the precipitation. The precipitate is washed with acetone and dried in vacuo. The product, 1-S-[6-(1,2,3,4-tetrahydroxybutyl)-2-p-dioxanylmethylmercuri]-1-thiosorbitol, corresponds to the formula

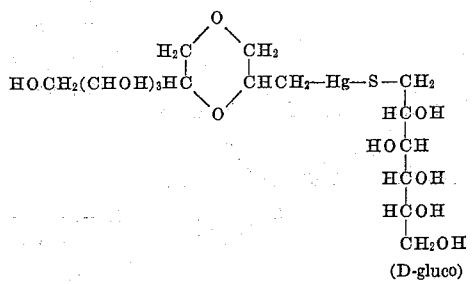
(D-gluco)

and is an amorphous hygroscopic solid.

Example 6

5.0 parts by weight of mercurated 3-allyl-D-mannitol, prepared as described in Example 3, are dissolved in 15 parts by volume of methanol to which one equivalent of 1-thioglycerol is added. The solution is concentrated in vacuo and the residue triturated with dry acetone and dried in vacuo. The product thus produced is highly soluble in water and is predominantly 1-S-[5,6-bis-(1,2-dihydroxyethyl) - 2 - p - dioxanylmethylmercuri]-1-thioglycerol, corresponding to the formula

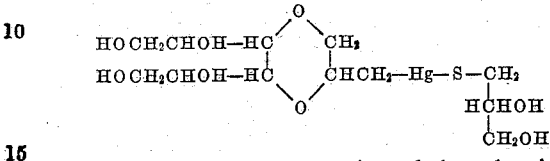

together with a minor proportion of the other isomer, 1 - S - [6-(hydroxymethyl) - 5 - (1,2,3-trihydroxypropyl)-2-p-dioxanylmethylmercuri]-1-thioglycerol corresponding to the formula

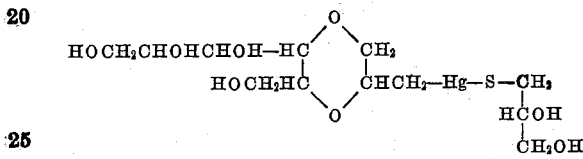

Example 7

2.5 parts of weight of mercurated 3-allyl-D-mannitol, prepared as described in Example 3, are dissolved in 5 parts by volume of methanol. A solution of an equivalent amount of 1-thioxylitol is added. The product precipitates from the reaction mixture and precipitation is made more complete by adding an additional 5 parts by volume of acetone. The mother liquor is decanted, the product washed with acetone and dried in vacuo to an amorphous solid. The product is a mixture of isomeric substances corresponding to the formulae

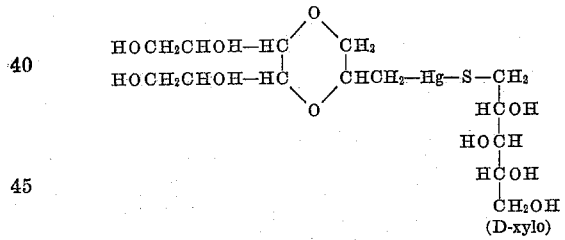
(D-xylo)

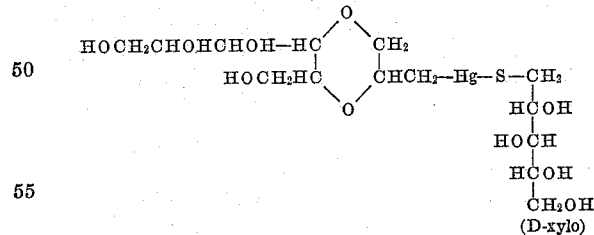
(D-xylo)

Example 8

4.81 parts by weight of mercurated 3-allyl-mannitol, prepared as described in Example 3, are dissolved in 25 parts by volume of methanol. A solution of 0.92 part by weight of α-mercapto-acetic acid in 5 parts by volume of 2-N-sodium hydroxide is then added. The reaction mixture is concentrated in vacuo and the product precipitated by adding 25 parts by volume of acetone. The product is then dissolved in 20 parts by volume of water. The solution is adjusted to pH 7–7.5 by addition of 2-N-sodium hydroxide and the resulting solution lyophilized to an amorphous, hygroscopic solid being a mixture of the isomeric compounds whose formulae are

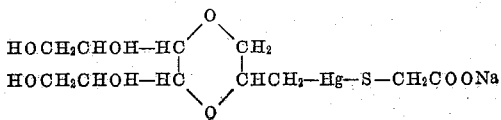

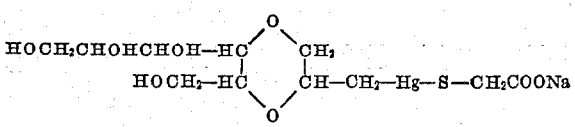

Example 9

90.6 parts by weight of 3-allyl-1,2;5,6-diisopropylidene-D-mannitol are dissolved in 750 parts by volume of dioxane. 95.4 parts by weight of mercuric acetate are added and the mixture stirred at 60° for five hours and at room temperature for 16 hours. The reaction mixture is filtered and the filtrate evaporated to dryness. The product crystallizes on treatment with hexane and ethyl acetate; it is filtered off and recrystallized from ethyl acetate—hexane yielding the mercurated product melting at 105–108° and having the structure

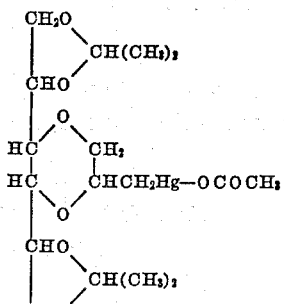

$[\alpha]_D = +32.9°$ (C = 2% in ethanol)

16.5 parts by weight of mercurated 3-allyl-1,2;5,6-diisopropylidene-D-mannitol are dissolved in 200 parts by volume of 50% by volume acetic acid. The solution is heated at 65° for one hour, then evaporated to dryness in vacuo to yield

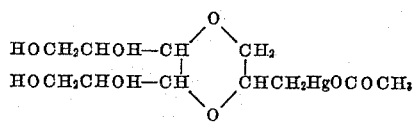

the mercurated product having the structure 11.8 parts by weight of the latter product are dissolved in 50 parts by volume of ethanol and added slowly to a solution of 5.12 parts by weight of thisorbitol (having an equivalent weight of 208) dissolved in 150 parts by volume of ethanol at 15° over a period of 15 minutes. A voluminous precipitate forms which is filtered off, washed with alcohol and acetone and dried in vacuo to give a product having the melting point 86–90° having the structure

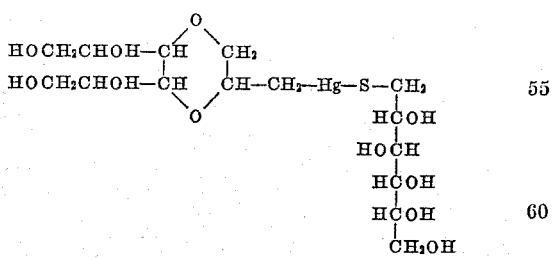

Example 10

35 parts by weight of mercurated 1,2;5,6-diacetone-3-allylmannitol, prepared as described in Example 9, are dissolved in 525 parts by volume of 50% aqueous acetic acid and warmed to 60° for two hours. The reaction mixture is then evaporated to dryness, the residue dissolved in 80 parts by volume of ethanol and again taken to dryness. The residue is then dissolved in 80 parts by volume of methanol, treated with activated carbon and filtered. 11.5 parts by weight theophylline are added and the mixture warmed to 50°. The theophylline dissolves rapidly. The clear solution is then run dropwise with vigorous stirring into 1,000 parts by volume of acetone.

The product precipitates. It is filtered off, washed with acetone and dried in vacuo. The product softens at 90–92°, melts at approximately 120° and has the following structure:

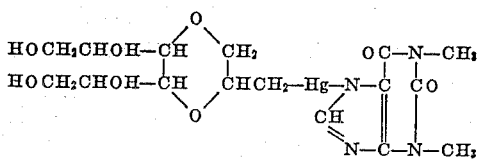

This application is a continuation-in-part of our co-pending application Serial No. 248,452, filed September 26, 1951.

Having thus disclosed the invention, what is claimed is:

1. A compound selected from the group consisting of those having the formula:

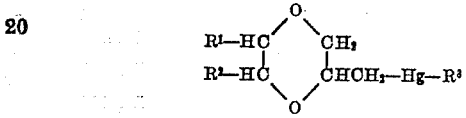

wherein $R^1$ is a member of the group consisting of hydrogen and —$(CHOH)_nCH_2OH$, $R^2$ is —$(CHOH)_nCH_2OH$, $R_3$ is a member of the group consisting of 1,3-dimethylxanthine-7-yl and polyhydroxy (lower) alkyl thio, and radicals of the formula X—S, wherein X is carboxy lower alkyl, $n$ being a number from 0 to 4, and the reaction product produced by reacting 3-allyl glucose with a mercuric salt in an aqueous medium and treating the resulting compound with a molar equivalent of 1-thiosorbitol.

2. A product produced by reacting 3-allyl glucose with a mercuric salt in an aqueous medium and treating the resulting compound with a molar equivalent of 1-thiosorbitol.

3. The compound of the formula

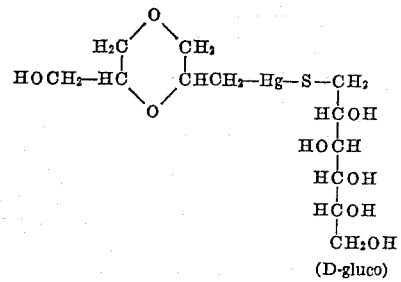

(D-gluco)

4. The compound of the formula

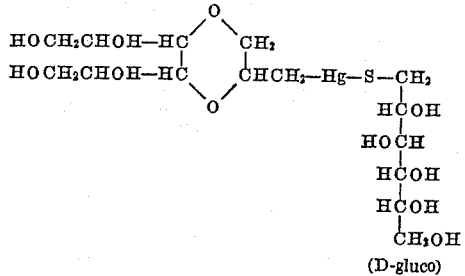

(D-gluco)

5. The compound of the formula

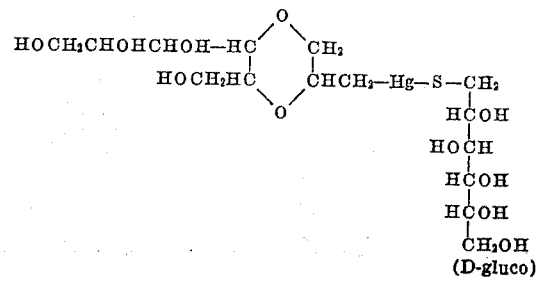

(D-gluco)

6. The compound of the formula
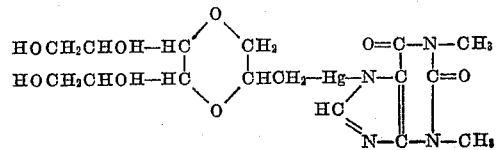
References Cited in the file of this patent
Straessle "Jour. Am. Chem. Soc.," (1951), vol. 73, pp. 504–5.